United States Patent Office 3,211,423
Patented Oct. 12, 1965

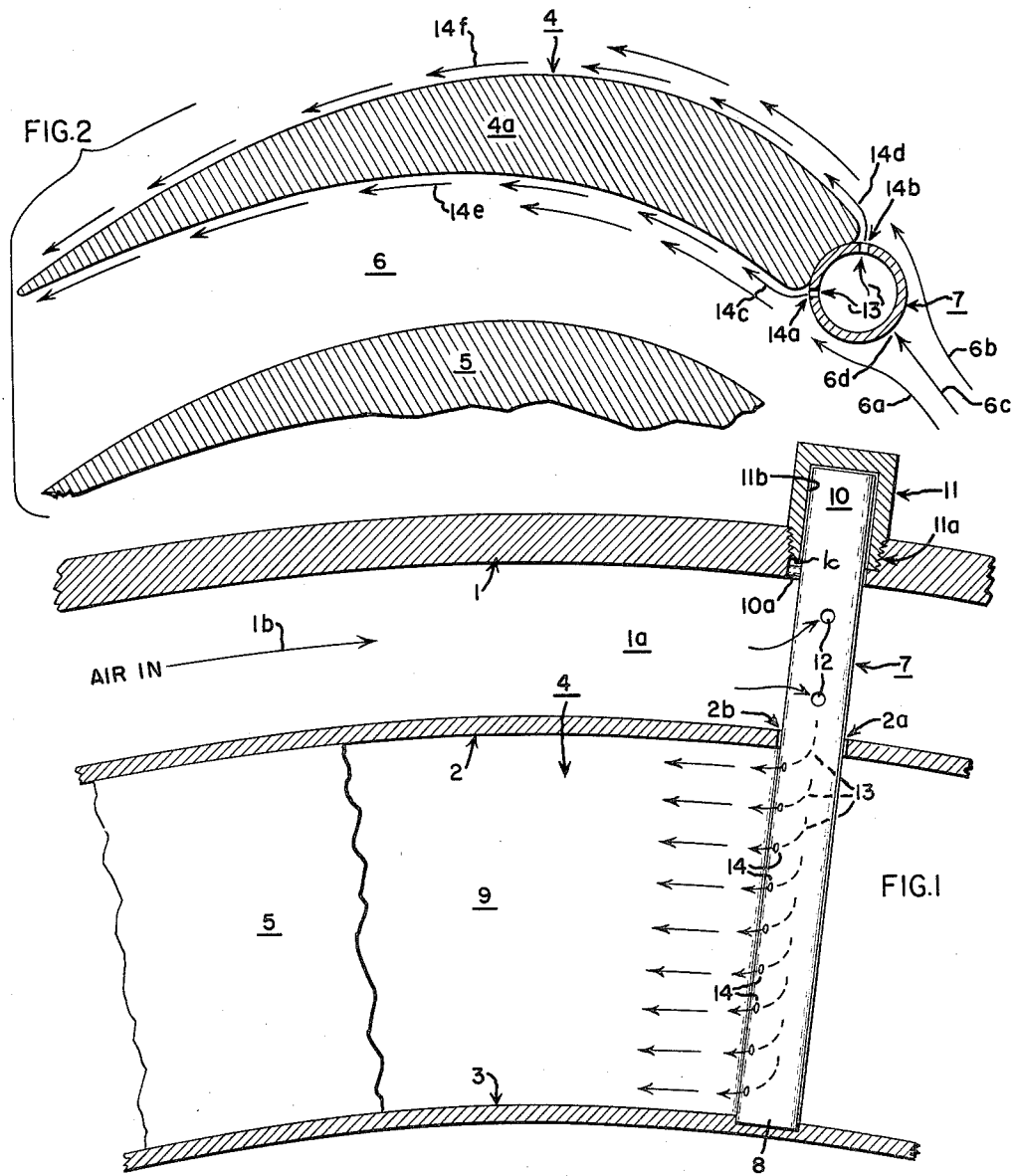

3,211,423
HIGH TEMPERATURE GAS TURBINE NOZZLE
PARTITION
Kendall E. Gilbert, Schenectady, N.Y., assignor to General Electric Company, a corporation of New York
Filed May 13, 1964, Ser. No. 366,972
2 Claims. (Cl. 253—39.1)

This invention relates to high-temperature gas turbine structures, particularly the nozzle arrangement for the high-temperature nozzle ring, specifically the blades or partitions which divide the ring into separate nozzle passages.

It is well known to those acquainted with gas turbine design that the overall thermal efficiency of the power plant is increased as the maximum temperature level in the plant is raised. Accordingly, it is urgently desired to raise, to the maximum extent feasible with the materials available, the highest thermodynamically effective temperature in the cylce. This maximum temperature will ordinarily occur in the passages of the first-stage nozzle ring. Such nozzle rings are ordinarily constructed of inner and outer concentric rings with radially extending blades or "partitions" dividing the annular gas flow passage into separate nozzles. These nozzles are ordinarily of an expanding configuration, so the temperature drops somewhat as the gas flows through the nozzle ring and the velocity increases.

It follows that the high-temperature nozzle partitions are one of the most critical items in the power plant with respect to the temperatures to which these parts must be subjected over a long period of time. This means that the high temperature nozzle partitions are subject to deterioration from corrosion, creep, and other high temperature phenomena. These phenomena also include fatigue and cracking due to "thermal shock," resulting from rapid changes in temperature of the operating fluid, as for instance when the power plant starts.

It follows that if the highest temperature in the gas turbine cycle is to be increased, it is important to find an effective way of protecting the nozzle partitions from deterioration. Numerous cooling arrangements have been suggested for these high temperature partitions, most of them involving complex cooling air passageways in the nozzle partition proper. The use of such air-cooled partitions is expensive and troublesome, and at the same time makes the nozzle partition very expensive.

Accordingly, a principal object of the invention is to provide a novel high temperature nozzle partition structure which is formed as a composite structure having a separate leading edge portion which is inexpensive to fabricate of high-temperature resistant materials, is adequately cooled, and at the same time provides a protective cooling air blanket for the main body portion of the nozzle partition.

Another object is to provide a composite nozzle partition structure in which the portion most subject to deterioration is readily replaced, without disassembling the turbine structure.

A further object is to provide a composite nozzle partition structure which may be readily revised during the process of development, in order to test various configurations of cooling passages, without the necessity for replacing the entire nozzle partition for each test.

A still further object is to provide a composite air-cooled nozzle partition structure in which the cooling passages are easy to inspect and clean if plugged by foreign matter in the gas main stream.

Another object is to provide a nozzle partition structure in which the main portion of the partition is not weakened by the presence of complex cooling air passages.

Other objects and advantages will become apparent from the following description, taken in connection with the accompanying drawings, in which FIGURE 1 is a transverse cross-section illustrating my improved composite nozzle partition structure, and FIGURE 2 is a top view in section showing the relation of the two separate parts which go to make up the composite partition.

Generally stated, the invention is practiced by fabricating the loading edge or "nose" of the nozzle partition as a separate member which may conveniently be made from an ordinary round tube, this tube serving as the cooling air inlet passage and having a pattern of holes through the tube wall for discharging a cooling and insulating blanket of air along the exterior surfaces of the rearward portion of the composite nozzle partition. Thus the separate tubular nose piece is subjected to the highest temperature and is, at the same time, most efficiently cooled by the internal flow of cooling air, serving simultaneously to blanket itself and/or the rearward portion of the nozzle partition with a protective layer of coolant fluid.

Referring now more particularly to the drawing, FIG. 1 shows the invention as applied to a gas turbine nozzle structure having an outer casing wall 1 and concentric outer and inner ring walls 2, 3. The nozzle passages are formed by a plurality of circumferentially-spaced blades or "partitions," one of which is shown at 4, the next adjacent blade at 5. As will be seen in FIG. 2, each adjacent pair of nozzle partitions 4, 5 define an expanding passageway 6 for the hot gas. The temperature of the gas approaching the nozzle partitions may be on the order of 1600 F. and due to expansion in the nozzle and thermodynamic effects in the boundary layer may drop to 1550 F. effective temperature in the boundary layer at the discharge or trailing edge of the partitions.

The main portion of the nozzle partition is of conventional structure, shown at 4a, preferably but not necessarily having no cooling air passages which would tend to weaken the nozzle partition and, at the same time, make it more expensive to fabricate. The essence of the present invention lies in the fact that the nose or leading edge of the partition is fabricated as a separate tubular member 7, which most conventiently is fabricated from a simple round tube. It will of course be appreciated that for more efficient aerodynamic design, the round tube 7 may be replaced by a specially contoured tubular member, designed in accordance with the aerodynamic characteristics of the fluid flow around the nozzle partition. In many applications a simple round tube will approximate the optimum aerodynamic design desired for the leading edge of the nozzle blade, and the use of a tubular member is most desirable from the standpoint of low-cost fabrication. Particularly during the developmental process, it may be desired to employ numerous alternative tubes 7 having different patterns of cooling air discharge nozzles, in order to ascertain the precise pattern which most efficiently forms the cooling air blanket for protecting the nozzle partition 4a. The use of a round tubular element 7 makes it readily possible to provide a multitude of developmental test samples having different patterns of cooling air passages for completing the developmental process at minimum cost.

The mechanical construction of the special tubular partition nose portion 7 will be seen in FIG. 1. The annular space between the outer casing wall 1 and the outer nozzle ring 2 defines an inner supply passageway 1a with air entering as indicated by the arrow 1b. This cooling air portion 1b is a comparatively small percentage of the combustion air admitted to the gas turbine combustor, most of the air previously having entered the combustion space so as to participate in the combustion process, the resulting hot gases being supplied to the nozzle ring comprising the outer ring 2, the inner ring 3, and the circumferential row of radially extending nozzle partitions 4, 5, etc.

It will be seen in FIG. 1 that the partition nose portion 7 is formed conventiently by a tubular member received in a fairly close fitting recess or anchor means in the inner wall 3 of the nozzle ring. This recess serves to locate the "nose members" accurately and prevent transverse vibration, or "flutter," under aerodynamic forces imposed by the hot gasses flowing through the nozzle.

It will be obvious from FIG. 1 that the tube 7 projects radially across the annular space 9 defined between the inner and outer nozzle rings 3, 2, passes freely through an opening 2a in the outer ring, projects across the air supply passage 1a, also projecting through a circular opening in the outer casing 1 and beyond the outer casing, with an outer end portion 10. This outer tube end portion 10 is received in the central bore of a retaining plug or cap 11, which has a threaded end engaging a mating thread in the outer casing at 11a. Cap 11 also has a central bore 11b receiving the tube end portion 10 with a sufficiently small clearance that there will be no substantial tendency for the tube 7 to vibrate transversely.

In order to insure proper circumferential orientation of the tube 7 relative to the nozzle blade portion 4a, a radially projecting dowel pin or key member 10a is secured to the outer periphery of tube end portion 10, and is arranged to be received in a groove 1c formed in the outer casing wall 1. It will be obvious from FIG. 1 that the radially projecting key member 10a received in groove 1c insures that the tube 7 can be inserted only in the proper circumferential orientation relative to the nozzle portion 4a, serving also to make sure that the tube cannot rotate to an improper orientation during operation.

It may be noted that there is a slight clearance at 2b between the outer nozzle ring 2 and the surface of the tube member 7. This clearance facilitates insertion of the tube, and has no significant effect on the performance of the arrangement, since if there is any leakage at this point, it will be of pure air leaking inwardly through the clearance space 2b.

As will be seen more particularly in FIG. 2, the interior of tube 7 provides the main supply channel for the partition cooling air, in a manner to be described more particularly hereinafter in connection with FIG. 2. It will be noted from FIG. 1 that the cooling air enters from passage 1a through a suitable number of spaced inlet ports 12, then flows radially as indicated by the dotted arrows 13, and is discharged from plurality of ports or nozzles 14 spaced in the tube wall, as will be better understood by reference to FIG. 2.

FIG. 2 illustrates the relation of the separate tubular inlet nose portion 7 and the more conventional body portion 4a of the nozzle partition 4. It will be apparent that the cooling air which flows radially inside the tube 7, as indicated by the arrows 13, is discharged through a carefully arranged pattern of ports 14a, 14b, etc. More specifically the discharge port 14a discharges cooling air as indicated by arrow 14c along the concave surface of nozzle partition portion 4a, while port 14b discharges a layer of cooling air as indicated by arrow 14d along the convex surface of nozzle partition 4a.

Comparison of FIGURES 1 and 2, will show that the discharge nozzles 14 are so disposed in radial and circumferential orientation relative to the adjacent portion of nozzle partition 4a that the jets discharged therefrom "fan out" to provide a substantially continuous layer of cooling and insulating air along the respective concave and convex surfaces of partition 4a. This cooling film is identified by the numeral 14e for the concave surface in FIG. 2, and by arrow 14f for the convex surface of the It will now be apparent from FIG. 2 how the cooling and insulating film 14e shields the partition portion 4a from the hot gas flowing in the nozzle passage 6. Specifically, the hot gas approaches as indicated by arrows 6a, 6b, divides so as to flow left and right around tube 7, and is kept from contacting the surfaces of nozzle partition 4a by the cooling and insulating films of air 14e, 14f. It may be noted that the hot gas approaching the tube 7 may have a portion represented by arrow 6c which produces a "stagnation area" at 6d, this stagnation zone being that location which separates the left-hand flow 6a from the right-hand flow 6b. This stagnation point will ordinarily be the very highest temperature encountered by any gas turbine part subject to the corrosive action of the hot gases. It will be apparent from FIG. 2 that the interior surface of tube 7 is strongly cooled by the abundant supply of cooling air 13, the outer surfaces of tube 7 being readily cooled by induction to the cooling air flow 13. Thus the cooling air 13 is somewhat pre-warmed before being discharged through the ports 14a, 14b.

Specifically, the stagnation temperature at 6d may be on the order of 1600° F., the cooling air entering the tube 7 through ports 12 may be on the order of 500° F., and the coolant discharged from the ports 14a, 14b may be on the order of 510° F.

It will be apparent from the above description how the special nose tube 7 forms a separate, readily fabricated member of the nozzle partition 4, at the same time serving as the cooling air supply passage and also the cooling air discharge means for effectively forming the cooling and insulating film 14e, 14f, over the respective surfaces of partition blade portion 4a.

The numerous advantages of the tubular nose portion will now be appparent. This tube may be made of a variety of materials depending on the application. In some cases it might be made of inexpensive material and frequently replaced. In others, it might be made of very expensive material, the economy in this case being realized by the relatively small amount of expensive material required for the nose and the ease of fabrication as compared with the entire partition. Ceramics and ceramic-metal compounds known as "Cermets" are also suitable for more tubes but would be less suitable for entire partitions. The separate nose piece 7 is itself strongly cooled by the internal air flow 13, and then forms by the ports 14a, 14b, the cooling and insulating films 14e, 14f. The tube may be readily fabricated of various materials, having the inlet ports 12 and the discharge ports 14a, 14b arranged in various patterns during the process of ascertaining the best possible arrangement in order to most effectively form the cooling and insulating films 14e, 14f. This makes the developmental process very simple and comparatively inexpensive, since the tubular member 7 is readily fabricated at minimum expense. Thus a great many alternate forms of tube 7 can be easily provided with various patterns of discharge nozzles.

An important further advantage of the separate nose piece 7, arranged as shown in FIG. 1 is that a suspicious or known defective tube 7 may be replaced by simply unscrewing the cap member 11, pulling out the tube 7, inspecting and cleaning it, or installing a new one. Thus the portion of the highly stressed nozzle partitions subject to the highest temperatures and to the most severe conditions of thermal shock and corrosion from hot gases is also the most readily replaced portion of the structure.

A further important advantage of this cooling system for a gas turbine nozzle partition lies in the fact that the partition portion 4a may need no cooling air passages, thus making it less subject to thermal shock, due to the difference in temperature between the cooling air and that of the hot gas flowing through the passages 6. Making the partition portion 4a of a solid section without cooling air passages of course reduces its manufacturing cost, as well as extending it life.

From an economic standpoint, my improved composite high temperature nozzle partition is advantageous since only the nose piece 7 need be formed of expensive high temperature resisting materials, the partition 4a being radily fabricated of less expensive, lower temperature materials by reason of the protection afforded portion 4a by the cooling and insulating films 14e, 14f. Thus, important economies are effected with respect to the materials required for these high-temperature nozzle partitions.

A further important advantage lies in the fact that there are no cooling air ports subject to plugging by reason of deposition of carbon from the hot gases therein. That is, the cooling air flow 13 passing through the nozzles 14a, 14b, will serve to blow the coolant nozzles clear of any carbon which might tend to deposit thereon. It is be noted that plugging of the cooling air discharge ports has been a serious factor limiting the application of air-cooled nozzle partitions in which cooling passages are formed in the body portion 4a of the partition.

Thus it will be seen that my composite nozzle partition results in a structure which is readily fabricated of comparatively low-cost materials, efficiently cooled so as to have long life in spite of the fact that the major fraction of the partition structure is fabricated of comparatively inexpensive low-temperature materials, while the highest temperature nose portion of the partition is fabricated of relatively more expensive high temperature resisting material and arranged to be readily replaced, if or when it does deteriorate to the point where replacement or servicing is necessary. It is of course of importance that inspection and servicing of the partition nose portion 7 may be easily effected.

While one specific form of the invention has been described herein, it will be obvious to those skilled in the art that innumerable modifications may be made. For instance, as noted above the simple round tube 7 may be replaced by a suitable contoured tubular member more accurately matching the desired aerodynamic flow pattern about the nozzle partition nose portion. The high temperature nose piece may be readily replaced with one of different design if it is found in serve that the nose piece originally used does not give the service life required, such replacement being readily effected as more efficient high-temperature resisting materials become available. Other minor mechanical details of the structure may be modified. For instance, there may be a compression spring in the cap 11 biasing tube end portion 10 radially inward, so as to resiliently seat tube 7 on inner wall 3, while permitting differential thermal expansion of tube 7 relative to the rings 2, 3 and casing 1. It is of course intended to cover by the appended claims all such modifications as fall within the true spirit and scope of the invention.

What is claimed as new and is desired to be secured by Letters Patent of the United States is:

1. In a high temperature turbomachine having inner and outer concentric annular members forming circumferential wall portions of a high temperature nozzle ring, and outer casing means surrounding and spaced from at least a portion of the nozzle ring to define a coolant fluid supply chamber, the combination of:
  (a) a plurality of circumferentially spaced, radially extending nozzle partitions disposed within the annular space defined between said inner and outer annular members, adjacent nozzle partitions cooperating to form hot gas nozzle passages,
  (b) each nozzle partition comprising a main body portion of curved cross-section and a separate leading edge member comprising a substantially tubular member having a downstream portion in substanitally abutting relation with the adjacent leading edge portion of said main body portion,
  (c) each of said tubular leading edge members extending from an anchor means on said inner annular member through said outer annular member and through said outer casing means,
  (d) each of said tubular leading edge members including means to prevent its rotation relative to said annular members,
  (e) each of said tubular leading edge members having a plurality of ports communicating with said nozzle passages for the passage of a film of cooling and insulating fluid over a surface portion of said main body portion,
  (f) each of said tubular leading edge members having a port communicating with said coolant fluid supply chamber to admit coolant fluid from said chamber to the interior of the tubular member, and
  (g) an end cap means on said outer casing detachably enclosing the projecting end portion of each tubular leading edge member whereby the leading edge member may be withdrawn from the nozzle ring assembly upon removal of said end cap means.

2. In an arcuate nozzle structure for a high temperature turbomachine having inner and outer radially spaced arcuate wall members, a casing member spaced from one of the arcuate wall members to form a cooling air supply chamber, and a plurality of nozzle partitions extending radially between said arcuate wall members, each of said nozzle partitions comprising
  (a) a main body member of substantially air-foil section and cooperating with adjacent partitions to form hot gas nozzle passages, and
  (b) a separate leading edge member comprising a tubular member with a downstream wall portion substantially in abutting relation with the upstream edge portion of said main body member,
  (c) said leading edge tubular member having ports for the passage of a film of cooling and insulating fluid over a surface portion of said main body members,
  (d) said tubular member having also a portion projecting into said air supply chamber with at least one inlet port admitting coolant fluid from said chamber to the interior of the tubular member.
  (e) said tubular member extending from an anchor means on said inner arcuate wall member through said outer arcuate wall member and through said casing member,
  (f) said tubular member including means to prevent its rotation relative to said arcuate members, and
  (g) an end cap means on said casing member detachably enclosing the projecting end portion of the tubular member whereby the tubular member may be withdrawn from the nozzle structure upon removal of said end cap means.

References Cited by the Examiner

UNITED STATES PATENTS

| 2,236,426 | 3/41 | Faber | 253—39.15 |
| 2,406,473 | 8/46 | Palmatier | 253—39.15 |
| 2,653,446 | 9/53 | Price. | |
| 2,701,120 | 2/55 | Stalker. | |
| 2,746,671 | 5/56 | Newcomb | 253—39.1 X |
| 2,800,273 | 7/57 | Wheatley et al. | |

FOREIGN PATENTS

| 1,151,369 | 8/57 | France. |
| 774,501 | 5/57 | Great Britain. |

SAMUEL LEVINE, *Primary Examiner.*

JULIUS E. WEST, *Examiner.*